United States Patent [19]
Takashima et al.

[11] Patent Number: 5,280,804
[45] Date of Patent: Jan. 25, 1994

[54] CONTROL VALVE

[75] Inventors: Makoto Takashima; Tsunenobu Matsumoto, both of Nagasaki, Japan

[73] Assignee: Mitsubihi Jukogyo Kabushiki Kaisha, Tokyo, Japan

[21] Appl. No.: 935,703

[22] Filed: Aug. 26, 1992

[30] Foreign Application Priority Data

Apr. 1, 1991 [JP] Japan .................................. 3-68491

[51] Int. Cl.⁵ ............................................. G05D 7/01
[52] U.S. Cl. ....................................... 137/501; 137/906
[58] Field of Search .............................. 137/501, 906

[56] References Cited

U.S. PATENT DOCUMENTS

| | | | |
|---|---|---|---|
| 3,017,897 | 1/1962 | Seguenot | 137/906 X |
| 3,554,222 | 1/1971 | Kihara | 137/501 |
| 3,556,135 | 1/1971 | Koyama | 137/501 |

Primary Examiner—Robert G. Nilson
Attorney, Agent, or Firm—Nixon & Vanderhye

[57] ABSTRACT

This invention is intended to control the flow rate and pressure in a valve body by operating a throttling valve connected to the opening of the valve body by a remote pipe. The construction of the control valve is as follows: A spool type pressure compensated control valve 3 is installed on the upstream side of a flow passage of the valve body having an inlet 2 and an outlet 5, and a variable orifice 3' is formed on the pressure compensated control valve 3. On the downstream of the pressure compensated control valve 3 is installed a flow control throttling valve 4, which is urged by a spring 7 in the direction of closing the flow passage. The spring chamber 12' of the flow control throttling valve 4 is connected to the outlet 5 through a central passage 12 in the throttling valve 4. A chamber 20 at the other end of the flow control throttling valve 4 is connected to the inlet 2 via a variable throttle 16, and is also open to the outside of the valve body. A pressure setting valve 22 and an external variable throttling valve 23 are connected to this opening.

6 Claims, 4 Drawing Sheets

CONTROL VALVE

FIELD OF THE INVENTION AND RELATED ART STATEMENT

This invention relates to a control valve for controlling the flow rate and pressure of a fluid.

A conventional control valve of this type, for example as shown in FIG. 4, is provided with a spool type pressure compensated valve e on the upstream side of the inside flow passage d of a valve body c having an inlet a and an outlet b, and a variable orifice f is formed on the pressure compensated valve e. On the downstream side of the pressure compensated valve e, a flow control throttling valve g is installed. By the fluid pressure on the upstream side of this throttling valve g, the pressure compensated valve e is operated in the direction of closing the flow passage d, while by the pressure on the downstream of the throttling valve g and the tension of a spring h, the pressure compensated valve e is operated in the direction of opening the flow passage d.

Therefore, as the flow rate increases, the pressure loss due to the throttling valve g increases. The pressure in the chamber in which the spring h is mounted becomes lower than the pressure on the other side of the pressure compensated valve e, so that the valve e is moved in the direction of closing the pressure compensated valve e, the flow rate being controlled. To change the flow rate of fluid passing through the valve, the degree of opening of the flow control throttling valve g is changed by rotating the throttling valve g manually from the outside, which causes a pressure loss.

The conventional control valve as shown in FIG. 4 presents the following problems. In order to change the flow rate of the conventional control valve, the flow control throttling valve g must be rotated manually or electrically. To perform the remote control of flow rate, therefore, a complicated control device for remote control is required. Also, with this system, only the flow rate at the outlet b can be controlled, but the pressure at the outlet b cannot be controlled.

OBJECT AND SUMMARY OF THE INVENTION

Accordingly, the present invention is aimed at solving the above-described problems. An object of the present invention is to provide a control valve which can control the flow rate and pressure in the valve body by operating a throttling valve connected to the opening of the valve body via a remote pipe.

In order to achieve the above object, in a control valve comprising a spool type pressure compensated valve on the upstream side of the inside flow passage of a valve body having an inlet and an outlet, on which a variable orifice is formed, and a flow control throttling valve installed on the downstream side of the flow passage, the present invention is characterized by the following (1), (2) and (3): (1) The flow control throttling valve is urged by a spring from one end in the direction of closing the flow passage, a chamber for the spring of the flow control throttling valve is connected to the outlet through a central passage installed in the throttling valve, a chamber at the other end of the flow control throttling valve is connected to the inlet through passages via a variable throttle and is open to the outside of the valve body, and a pressure setting means is connected to the opening, so that the degree of opening of the flow control throttling valve can be changed by opening the variable throttle to an appropriate degree of opening and changing the setting pressure of the pressure setting means. (2) The pressure setting means mentioned in item (1) comprises a pressure setting valve and an external variable throttling valve, so that the degree of opening of the flow control throttling valve can be changed by opening the variable throttle installed in the passage connecting the chamber at the other end of the flow control throttling valve to the inlet, closing the external variable throttling valve, and changing the setting pressure of the pressure setting valve installed outside the valve body. (3) In the flow control throttling valve described in item (1) or (2), the spring chamber of the flow control throttling valve is connected to the outlet through a passage disposed in the valve body.

The control valve of the present invention, as described above with reference to FIG. 1, comprises a spool type pressure compensated valve 3 on the upstream side of the inside flow passage of a valve body 1 having an inlet 2 and an outlet 5, on which a variable orifice 3' is formed, and a flow control throttling valve 4 installed on the downstream side of the flow passage. The flow control throttling valve 4 is urged by a spring 7 in the direction of closing the flow passage. The spring chamber 12' of the flow control throttling valve 4 is connected to the outlet 5 through a central passage 12 in the throttling valve 4. A chamber 20 at the other end of the flow control throttling valve 4 is connected to the inlet 2 through, passages 15, 17 via a variable throttle 16, and is also open to the outside of the valve body. The pressure setting valve 22 and the external variable throttling valve 23 are connected to this opening as a pressure setting means. When the external throttling valve 23 is opened appropriately and the chamber at the other end of the flow control throttling valve 4 is connected to the inlet 2, the degree of opening of the flow control throttling valve 4 in the valve body 1 can be changed and the flow rate can be controlled by changing the setting pressure of the pressure setting valve 22 if the degree of opening of the variable throttle 16 installed in the passages 15, 17 has been adjusted appropriately in advance.

The pressure Pd at the outlet 5 is expressed as $$Pd = (A \cdot Ps - f)/A$$

where, A is the cross sectional area of flow control throttling valve 4, Ps is the setting pressure of the pressure setting valve 22, and f is the spring force of throttling valve spring 7. Because $f << A \cdot Ps$, $$Pd \doteq Ps$$

The functions of the control valve of the present invention will be described below by dividing into two functions: the flow control function and the pressure control function.

Flow Control Function

As the flow rate increases, the flow rate of fluid passing through the throttling valve portion 4' increases; thus, the pressure loss also increases. That is to say, the pressure of a flow passage 11 becomes higher than that of the outlet 5. The flow passage 11 is connected to a small-diameter chamber 10 of the pressure compensated control valve 3, and the outlet 5 is connected to a large-diameter chamber 14 via a passage 13. Therefore, the pressure of the small-diameter chamber 10 becomes higher than that of the large-diameter chamber 14.

At this time, when the pressure of the small-diameter chamber 10 becomes higher than the force due to the difference in area between two chambers of the pressure compensated control valve 3 plus the force of the spring 6, the pressure compensated control valve 3 moves to the left in FIG. 1, so that the variable orifice 3' decreases, the flow rate being reduced.

Thus, when the flow rate exceeds the set value, the variable orifice 3' is moved in the direction of closing the flow passage due to the pressure loss of the throttling valve portion 4', which automatically throttles and reduces the flow rate.

Pressure Control Function

The pressure control function is performed by the flow control throttling valve 4 only. The force of throttling valve spring 7 on the left side of the flow control throttling valve 4 is regarded as being negligibly low. The pressure of outlet 5 is applied to a spring chamber 12' via the central passage 12, and the pressure of remote pipe 21' is applied to the chamber 20 at the other end. The pressure receiving area of the spring chamber 12' of the flow control throttling valve 4 is equal to that of the chamber 20 at the other end.

Thus, since the pressures of the remote pipe 21', a passage 21, and the chamber 20 at the other end are equal, the pressure of the chamber 20 at the other end is equal to that of the spring chamber 12', so that the flow control throttling valve 4 does not move and maintains its position.

If the pressure of the chamber 20 at the other end is changed by the pressure setting valve 22 until the pressure of the chamber 20 at the other end is higher than that of the spring chamber 12', the flow control throttling valve 4 moves to the left, by which the degree of opening of the throttling valve portion 4' increases and at the same time the flow rate to the outlet 5 increases. As a result, the pressure of the outlet 5 increases.

Since the pressure of the outlet 5 is equal to that of the spring chamber 12', the pressure of the spring chamber 12' increases with increasing pressure of the outlet 5. The pressure of the spring chamber 12' becomes equal to that of the chamber 20 at the other end due to an automatic regulating action. Therefore, the pressure of the chamber 20 at the other end becomes equal to that of the outlet 5.

In effect, according to this invention, when the pressure of the chamber 20 at the other end is set to a certain value, the pressure of the outlet 5 can be a constant value.

Thus, the pressure and flow rate in the valve body 1 can be controlled in a remote control mode by changing the setting pressure of the pressure setting valve 22 installed outside the valve body 1 via the external remote pipe 21'.

DETAILED DESCRIPTION OF PREFERRED EMBODIMENTS

Figure 1:
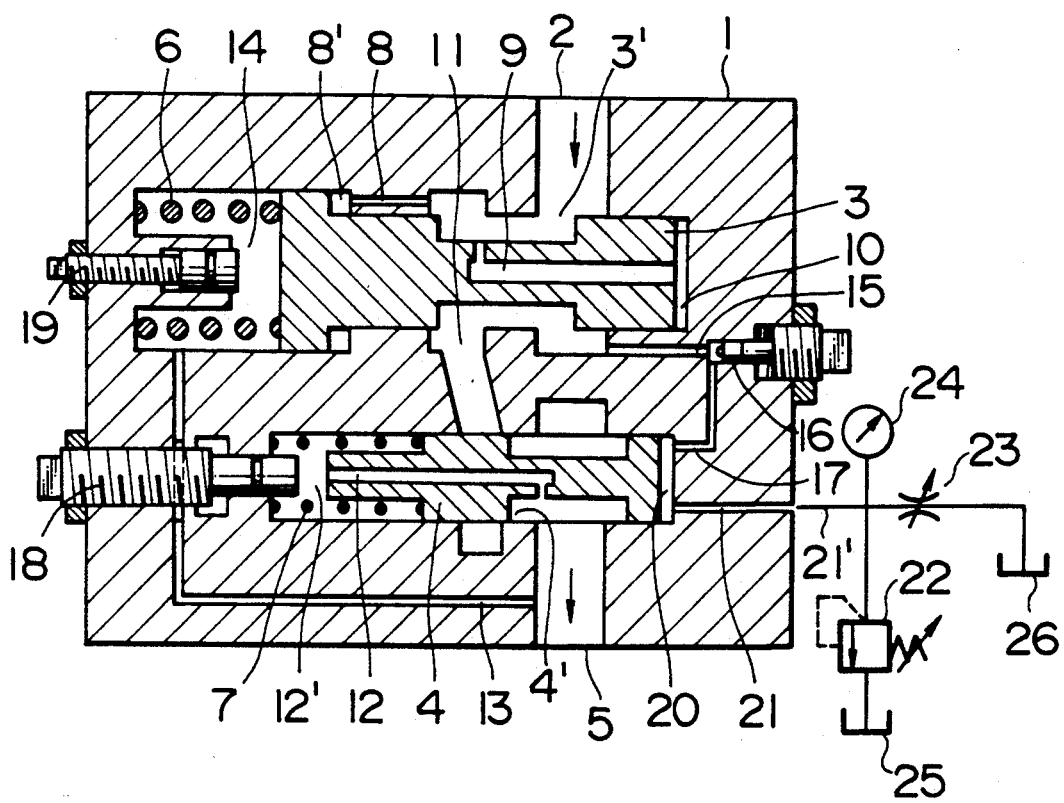
FIG. 1 is a sectional view of a first embodiment of the control valve in accordance with the present invention.

A first embodiment of the control valve in accordance with the present invention will be described in detail with reference to FIG. 1. The control valve is provided with a spool type pressure compensated control valve 3 on the upstream side of the inside flow passage of a valve body 1 having an inlet 2 and an outlet 5, and a variable orifice 3' is formed on the pressure compensated control valve 3. On the downstream of the flow passage, a flow control throttling valve 4 is installed to form a throttling valve portion 4'.

The pressure compensated control valve 3 is urged in the direction of normally opening the flow passage by a pressure compensated control spring 6 mounted in a large-diameter chamber 14 for the pressure compensated valve. In the large-diameter chamber 14 for the pressure compensated valve, a stopper 19 is installed to limit the stroke of the pressure compensated control valve 3. On the side of the large-diameter chamber 14 of the pressure compensated control valve 3, a flow passage large-diameter chamber 8' which communicates with the inlet 2 through a passage 8 is formed, and on the side opposite to the large-diameter chamber 14 is formed a small-diameter chamber 10. The small-diameter chamber 10 is connected to the variable orifice 3' through a passage 9 in the pressure compensated control valve 3. The pressure compensated control valve portion 3 is connected to the flow control throttling valve portion 4 through a flow passage 11, and the large-diameter chamber 14 for the pressure compensated valve is connected to the outlet 5 through a passage 13.

The flow control throttling valve 4 is urged in the direction of normally closing the flow passage by a pressure compensated throttling valve spring 7 mounted in a flow control valve spring chamber 12'. The spring chamber 12' of the flow control throttling valve 4 is connected to the outlet 5 through a central passage 12 disposed in the throttling valve 4. In the spring chamber 12, a stopper 18 is installed to limit the stroke of the flow control throttling valve 4. A chamber 20 disposed on the side opposite to the spring chamber 12' of the flow control throttling valve 4 is connected to the inlet 2 through passages 15, 17 via a variable throttle 16, and is also open to the outside of the valve body 1 through a passage 21. To this opening are connected a pressure setting valve 22, an external variable throttling valve 23, and a pressure gauge 24 via an external remote pipe 21'. The pressure setting valve 22 and the external variable throttling valve 23 are connected to a respective tank 25, 26.

Next, a second embodiment of the control valve in accordance with the present invention will be described.

Figure 2:
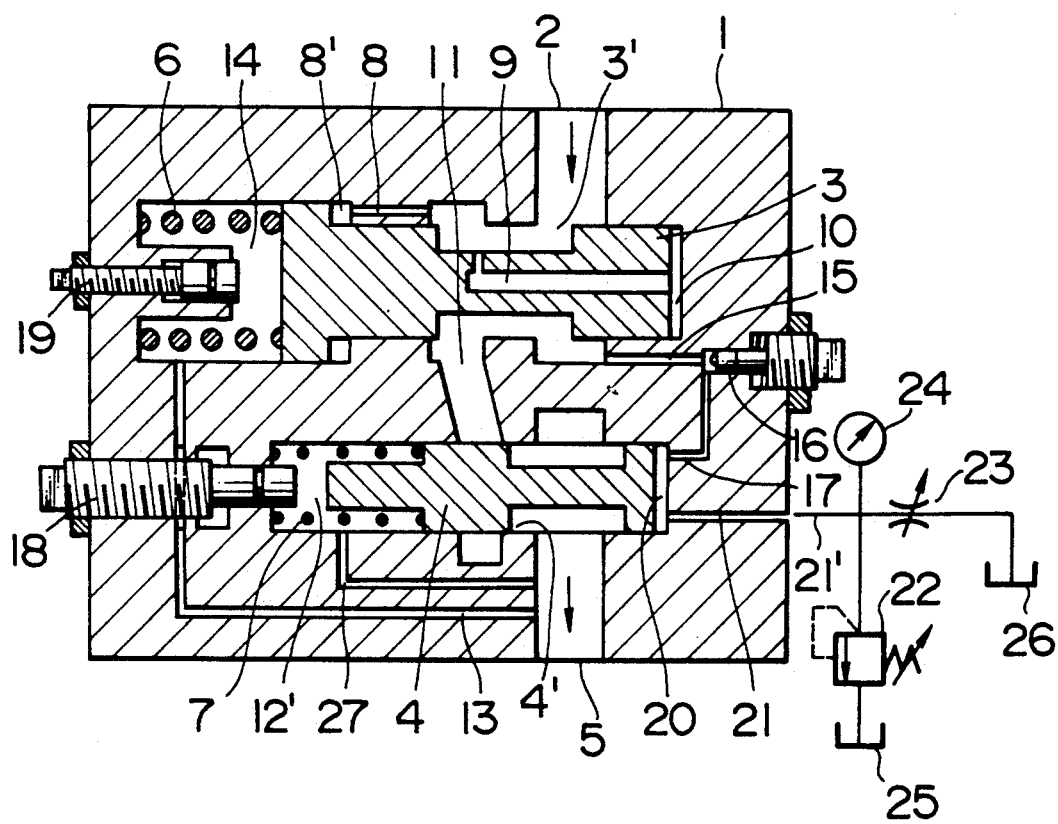
FIG. 2 is a sectional view of a second embodiment of the control valve in accordance with the present invention.

FIG. 2 shows a second embodiment in which a passage 27 is disposed in the valve body 1 in place of the central passage 12 in the flow control throttling valve 4 shown in FIG. 1. The passage 27 disposed in the valve body 1 in FIG. 2, like the central passage 12 in the flow control throttling valve 4 in FIG. 1, serves as a passage for connecting the spring chamber 12' to the outlet 5.

Figure 3:
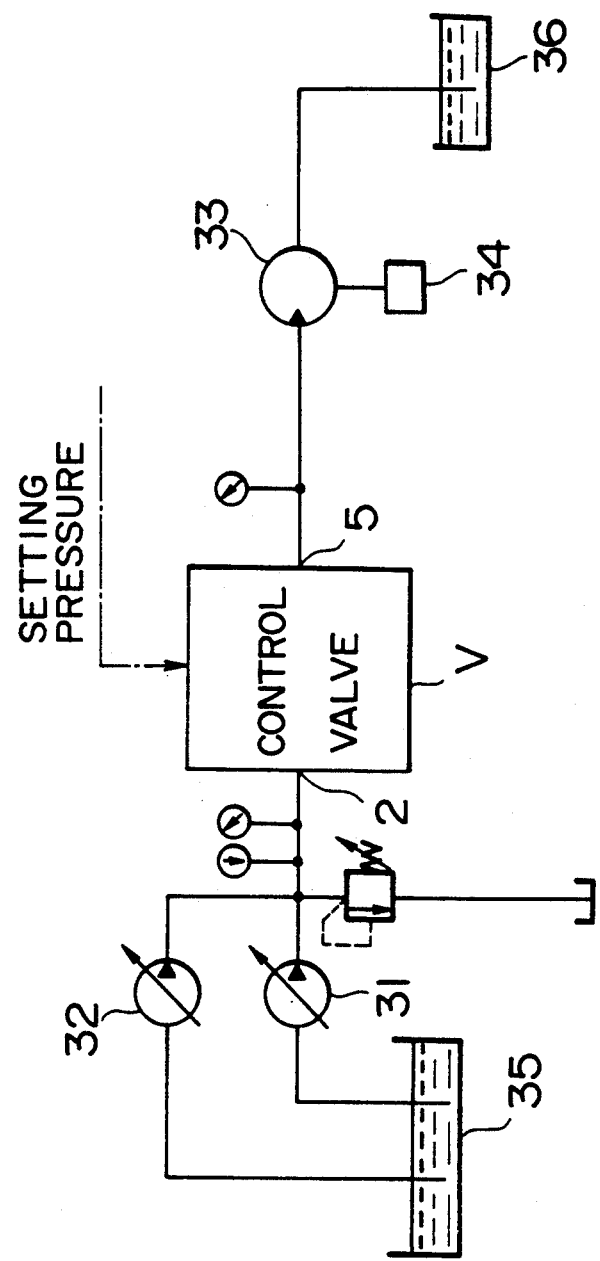
FIG. 3 is a circuit diagram showing an example of the system using the control valve in accordance of the present invention.
Figure 4:
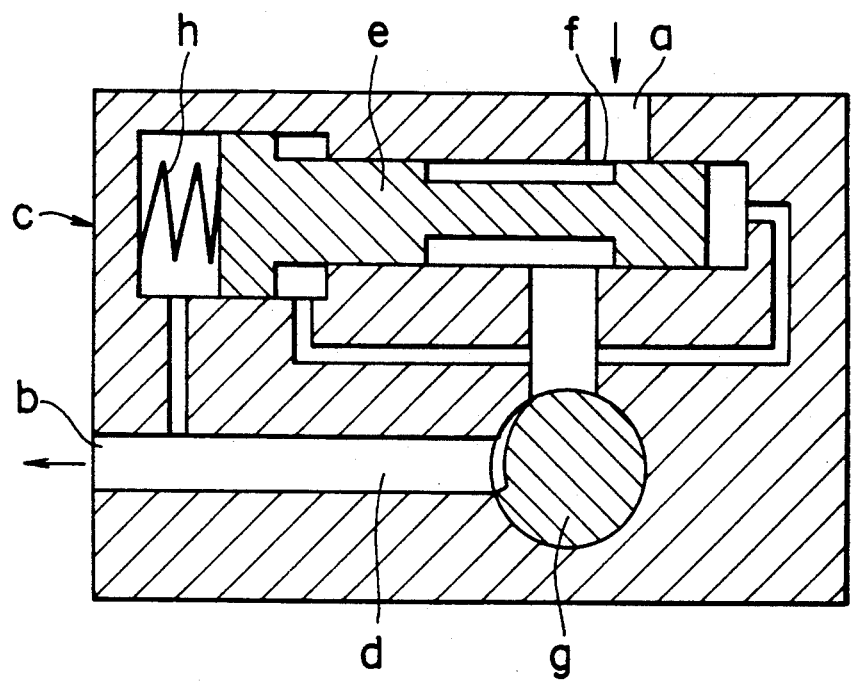
FIG. 4 is a sectional view of a conventional control valve.

FIG. 3 shows an example of a system for using the control valve described as the first and second embodiments.

In FIG. 3, the working fluid delivered from hydraulic pumps 31, 32 enters a control valve V through an inlet 2 and goes out of the control valve V through an outlet 5. At this time, the flow rate is controlled by the control valve and the setting pressure, and outputted to a hydraulic motor 34.

The hydraulic motor 34 drives a centrifugal pump, winch drum, and other loads. Reference numerals 35, 36 denote tanks.

According to the above-described embodiments of the control valve, the flow control throttling valve 4 is urged by the spring 7 in the direction of closing the flow passage. The spring chamber 12' of the flow control throttling valve 4 is connected to the outlet 5 through the central passage 12 in the throttling valve 4, and the chamber 20 at the other end of the flow control throttling valve 4 is connected to the inlet 2 via the variable throttle 16 and is also open to the outside of the valve body 1. Since the pressure setting valve 22 and the external variable throttling valve 23 are connected to this opening, the flow control throttling valve 4 in the valve body 1 is operated in a remote control mode by changing the setting pressure of the pressure setting valve 22, by which the pressure and the flow rate in the valve can be controlled. This arrangement provides an effect of easy remote control as compared with the conventional control valve in which the flow rate throttling valve g is rotated manually or electrically.

I claim:

1. A control valve comprising a spool type pressure compensated valve on the upstream side of the inside flow passage of a valve body having an inlet and an outlet, on which a variable orifice is formed; and a flow control throttling valve installed on the downstream side of the flow passage, wherein said flow control throttling valve is urged by a spring from one end in the direction of closing the flow passage, a chamber for said spring of said flow control throttling valve, means for connecting said chamber to said outlet, a chamber at the other end of said flow control throttling valve is connected to said inlet through passages via a variable throttle and is open to an outside opening of the valve body, and a pressure setting means is connected to said opening, so that the degree of opening of said flow control throttling valve can be changed by opening said variable throttle to an appropriate degree of opening and changing the setting pressure of said pressure setting means.

2. A control valve according to claim 1, wherein said means for connecting comprises a central passage in said throttling valve.

3. A control valve according to claim 1, wherein said means for connecting comprises a passage disposed in said valve body.

4. A control valve comprising a spool type pressure compensated valve on the upstream side of the inside flow passage of a valve body having an inlet and an outlet, on which a variable orifice is formed; and a flow control throttling valve installed on the downstream side of the flow passage, wherein said flow control throttling valve is urged by a spring from one end in the direction of closing the flow passage, a chamber for said spring of said flow control throttling valve, means for connecting said chamber to said outlet, a chamber at the other end of said flow control throttling valve is connected to said inlet through passages via a variable throttle and is open to an outside opening of the valve body, a pressure setting valve and an external variable throttling valve are connected to said opening, so that the degree of opening of said flow control throttling valve can be changed by opening said variable throttle installed in the passage connecting the chamber at the other end of said flow control throttling valve to said inlet, closing said external variable throttling valve, and changing the setting pressure of said pressure setting valve installed outside of the valve body.

5. A control valve according to claim 4, wherein said means for connecting comprises a central passage in said throttling valve.

6. A control valve according to claim 4, wherein said means for connecting comprises a passage disposed in said valve body.

* * * * *